July 23, 1940.  B. VON PENTZ  2,209,180
OIL FILTER
Filed Nov. 22, 1938
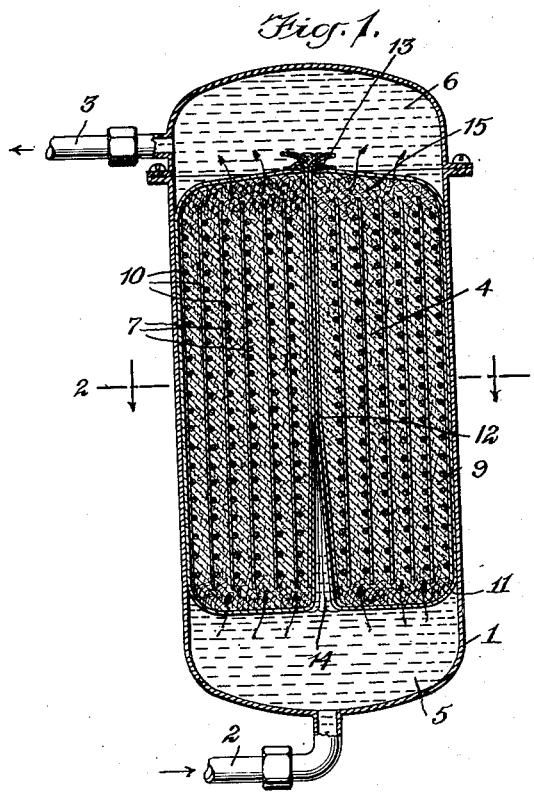
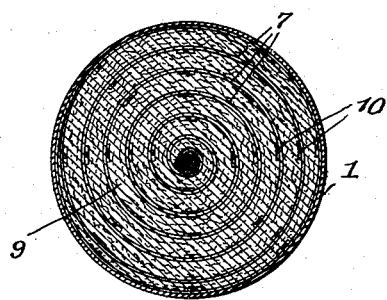
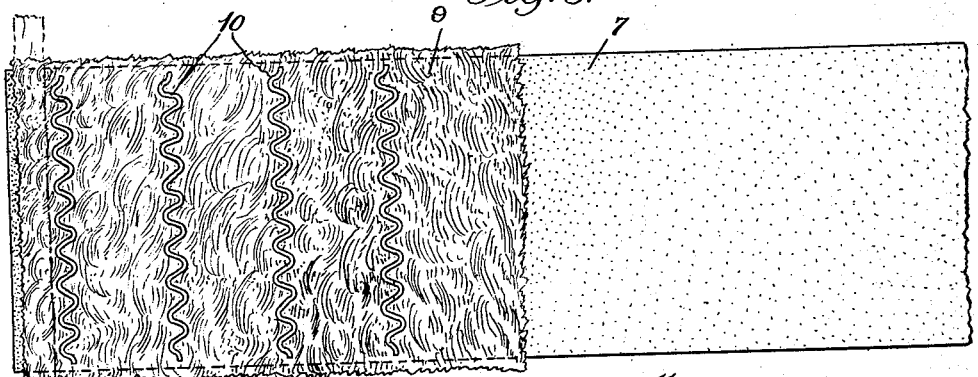
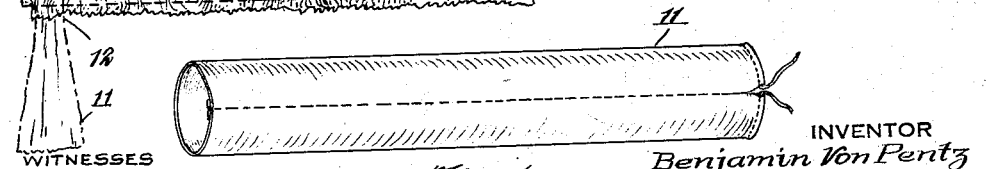
INVENTOR
Benjamin Von Pentz
BY
ATTORNEYS Patented July 23, 1940

2,209,180

UNITED STATES PATENT OFFICE 2,209,180

OIL FILTER

Benjamin Von Pentz, Springfield, Long Island, N. Y.

Application November 22, 1938, Serial No. 241,780

1 Claim. (Cl. 210—131)

This invention relates to oil filters and has for an object to provide a construction which is an improvement over my prior Patent No. 2,093,877.

Another object of the invention is to provide an oil filter for use on automobile engines and similar engines wherein the filter is formed to quickly remove large particles of dirt and then remove the smaller impurities in the oil, including water, gasoline, and the like.

A further object of the invention is to provide an oil filter having filtering mediums arranged to remove certain impurities in a mechanical way and other impurities, as for instance acids, in a chemical way, whereby the cleaned oil may be restored to substantially its original condition.

Additional and more specific objects of the invention are to provide an oil filter capable of being used with an automobile engine wherein the oil is filtered under some pressure and with appreciable rapidity.

In the accompanying drawing—

Fig. 1 is a longitudinal vertical sectional view through an oil filter disclosing an embodiment of the invention;

Fig. 2 is a transverse sectional view through Fig. 1, approximately on the line 2—2;

Fig. 3 is a plan view of the principal filtering element illustrated in Fig. 1 with certain parts removed;

Fig. 4 is a perspective view of a textile fabric tube embodying certain features of the invention.

Referring to the accompanying drawing by numerals, 1 indicates a metal casing which is tubular and which is closed at both ends. Preferably the parts are so arranged that the dirty oil will pass into the device through the inlet pipe 2 and the clean oil pass out through the outlet pipe 3.

Arranged in the casing 1 is a filter 4, which is preferably held by friction centrally of the casing so that there will be a lower chamber 5 and an upper chamber 6. As the oil enters under some pressure it fills the lower chamber 5 and then passes upwardly through the filter 4 and fills up the chamber 6, from which it passes to a desired point through the outlet pipe 3. When the device is connected with an automobile engine preferably there is a continuous circulation of the oil through the device. The filter 4 is made flat and then coiled into the shape shown in Figs. 1 and 2. During this operation an outer textile fabric bag is positioned to surround and form the outside of the filter while a portion of the bag extends through the center of the filter from top to bottom.

As illustrated in Fig. 3, there is provided a sheet of paper 7, which is impregnated with fuller's earth 8 or similar material that will assist in neutralizing the acid in the oil being filtered. On top of the sheet of paper 7 there is provided a layer 9 of filtering medium, as for instance waste cotton or other filtering fiber in a more or less loose state. The layer 9 preferably extends a short distance on each side of the paper 7 and is supported by a number of supporting members 10 which are preferably formed from metal and are zigzag or serpentine in shape, as illustrated particularly in Fig. 3. Preferably these supports 10 are slightly less in length than the width of the paper 7. After the desired length of paper has been provided and the members 9 and 10 applied thereto, a textile fabric bag 11 is arranged as shown by the dot-and-dash lines 12 in Fig. 3. The textile bag 11 is then bunched together or collapsed transversely and placed in the position indicated by the numeral 12 in Fig. 3. The paper 7 and the layer 9 are then moved around the bag when in this collapsed condition until a complete coil or winding is provided, as indicated in Fig. 2. After this has been done, the protruding part of the bag 11 is brought around and telescoped over the outside of the wound filtering structure. Then the two ends are tied with a suitable cord 13, as illustrated in Fig. 1. Usually this leaves a cone-shaped opening 14 in the bottom with the members 10 extending from near the top to near the bottom of the filter and spaced evenly transversely, as viewed in Fig. 1. This stiffens or holds the parts in proper place and also provides separate vertical channels through which the oil is adapted to pass. In other words, a small quantity of oil passes between the layers, as shown in Fig. 1, and, consequently, the oil is acted upon by the filtering mediums and the fuller's earth 8, so that when the oil eventually escapes into chamber 6 it will be purified and cleansed ready for further use. The filtering device may be used continuously until the filtering mediums become exhausted or filled with foreign matter and then the entire filtering structure 4 is removed and a new one provided.

It will be noted that the oil must first pass through the textile fabric bag 11 at the bottom and then through the extending portion of the fiber layer 9. After passing through these two layers the oil passes upwardly between the various layers of paper and through the fibrous material adjacent thereto so that it is discharged into the zone 15 at the top and from this zone the oil passes through the top part of the bag 11 into chamber 6.

I claim:

A filtering member for a filter of the character described, comprising a strip of paper impregnated with fuller's earth, a strip of fibrous material arranged against one surface of said paper and projecting beyond the edges thereof, a plurality of spaced bracing members coacting with said fibrous strip, each of said bracing members being formed from a single metal rod formed zigzag for its full length and projecting from near one edge of the fibrous material to the other, said fibrous strip and said strip of paper being formed as a coil, and a tubular textile fabric member having one section extending through the center of the coil and the other section extending across the bottom and over the sides and top of the coil.

BENJAMIN VON PENTZ.